United States Patent [19]

Witkewitz et al.

[11] Patent Number: 5,087,458
[45] Date of Patent: Feb. 11, 1992

[54] SOLUBILIZED OLEORESIN BLACK PEPPER, METHOD OF MAKING SAME, AND METHOD OF ADDING SAME TO CHEWING GUM

[75] Inventors: David L. Witkewitz, Ridgeview; Mansukh M. Patel, Downers Grove, both of Ill.

[73] Assignee: Wm. Wrigley Jr. Company, Chicago, Ill.

[21] Appl. No.: 492,851

[22] Filed: Mar. 13, 1990

[51] Int. Cl.$^5$ ................................................. A23G 3/30
[52] U.S. Cl. ........................................... 426/3; 426/4; 426/6; 426/538; 426/651
[58] Field of Search ..................... 426/3, 4, 6, 651, 538

[56] References Cited

U.S. PATENT DOCUMENTS

| | | | |
|---|---|---|---|
| 3,991,214 | 11/1976 | Slangan et al. | 426/3 |
| 4,159,347 | 6/1979 | Yoshida et al. | 426/3 |
| 4,409,257 | 11/1983 | Deline | 426/651 |
| 4,925,688 | 5/1990 | Voituriez | 426/651 |

OTHER PUBLICATIONS

Arctander, Perfume and Flavor Chemicals, vol. I, 1969, Publ. by the author, Montclair, N.J., Monograph No. 618.
Fenaroli's Handbook of Flavor Ingredients, 2nd Ed., vol. 1, 1975, pp. 432–434.
Farrell-Spices, Condiments, and Seasonings, 1985, pp. 178-183.

*Primary Examiner*—Donald E. Czaja
*Assistant Examiner*—Jean L. Aberle
*Attorney, Agent, or Firm*—Willian Brinks Olds Hofer Gilson & Lione

[57] ABSTRACT

A homogenous, liquid solution comprising oleoresin black pepper and either cinnamyl alcohol or phenyl ethyl alcohol is disclosed. Additionally, a method of manufacturing a homogenous, liquid solution comprising oleoresin black pepper, as well as a method of adding oleoresin black pepper to chewing gum pursuant to such a solution is disclosed.

11 Claims, No Drawings

SOLUBILIZED OLEORESIN BLACK PEPPER, METHOD OF MAKING SAME, AND METHOD OF ADDING SAME TO CHEWING GUM

BACKGROUND OF THE INVENTION

The present invention is directed to a homogenous, free flowing, liquid oleoresin composition comprising oleoresin black pepper and either cinnamyl alcohol or phenyl ethyl alcohol; a method of preparing the aforesaid compositions, and a method of adding oleoresin black pepper to a chewing gum pursuant to a composition of oleoresin black pepper and either cinnamyl alcohol or phenyl ethyl alcohol.

Oleoresin black pepper is an extract of pepper produced by extracting piperine, volatile oils and fixed oils from dried pepper pods by using a solvent, such as ethylene dichloride or acetone. After extraction, the solvent is removed, as by distillation, and there remains an extract of pepper known as oleoresin black pepper. The oleoresin black pepper is an unstable paste-like composition which, upon standing, separates into two phases. As a result of its instability, oleoresin black pepper is difficult to utilize in the manufacture of compositions that require its presence. By solubilizing the oleoresin black pepper into a stable, free-flowing, liquid oleoresin composition, the oleoresin black pepper becomes much easier to handle when used in various manufacturing processes. Unfortunately, oleoresin black pepper is very difficult to solubilize. The only solvent available for solubilizing oleoresin black pepper, prior to the discovery of the present invention, was benzyl alcohol. See U.S. Pat. No. 4,409,257.

The present disclosure is directed to the discovery of two more such agents, cinnamyl alcohol and phenyl ethyl alcohol. The use of cinnamyl alcohol as the solubilizing agent is particularly advantageous as, unlike benzyl alcohol and phenyl ethyl alcohol, cinnamyl alcohol not only avoids diluting the chewing gum's flavor, but it actually enhances the cinnamon flavor of the chewing gum.

SUMMARY OF THE PRESENT INVENTION

In accordance with one embodiment of the present invention, there is a provided a homogenous, free-flowing, liquid solution of oleoresin black pepper comprising from about 10% to about 55% by weight oleoresin black pepper and from about 45% to about 90% by weight cinnamyl alcohol.

In another embodiment of the present invention, there is provided a homogenous, free-flowing, liquid solution of oleoresin black pepper comprising from about 10% to about 55% by weight oleoresin black pepper and from about 45% to about 90% by weight phenyl ethyl alcohol.

In yet another embodiment of the present invention, there is provided a method of manufacturing a homogenous, free-flowing, liquid solution of oleoresin black pepper. The method comprises providing oleoresin black pepper and a solution of cinnamyl alcohol. The oleoresin black pepper and solution of cinnamyl alcohol are then mixed in such amounts so that the resulting composition comprises from about 10% to about 55% by weight oleoresin black pepper and from about 45% to about 90% by weight cinnamyl alcohol.

In another embodiment of the present invention, an amount of oleoresin black pepper and a solution of phenyl ethyl alcohol are mixed. The aforesaid are mixed in such amounts so that the resulting composition comprises a homogenous, free-flowing, liquid solution of oleoresin black pepper comprising from about 10% to about 55% by weight oleoresin black pepper and from about 45% to about 90% by weight phenyl ethyl alcohol.

In yet another embodiment of the present invention, a method of adding oleoresin black pepper to chewing gum is provided. Specifically, the oleoresin black pepper is added to the chewing gum pursuant to a free flowing, liquid solution comprising oleoresin black pepper in such amounts so that oleoresin black pepper comprises from about 0.005% to about 0.5% by weight of the chewing gum.

DETAILED DESCRIPTION OF THE PREFERRED EMBODIMENTS

In accordance with one embodiment of the present invention, the homogenous, free-flowing, liquid solution of oleoresin black pepper will comprise from about 10% to about 55% by weight oleoresin black pepper and from about 45% to about 90% by weight cinnamyl alcohol. Preferably, the aforesaid solution will comprise from about 30% to about 50% by weight oleoresin black pepper and from about 50% to about 70% by weight cinnamyl alcohol. Most preferably, the composition of the present invention will comprise from about 35% to about 45% by weight oleoresin black pepper and from about 55% to about 65% by weight cinnamyl alcohol.

In accordance with another embodiment of the present invention, there is provided a homogenous, free-flowing liquid solution of oleoresin black pepper comprising from about 10% to about 55% by weight oleoresin black pepper and from about 45% to about 90% by weight phenyl ethyl alcohol. Preferably, the aforesaid solution will comprise from about 30% to about 50% by weight oleoresin black pepper and from about 50% to about 70% by weight phenyl ethyl alcohol. Most preferably, the solution of oleoresin black pepper will comprise from about 45% to about 50% by weight oleoresin black pepper and from about 50% to about 55% by weight phenyl ethyl alcohol.

The present invention is also directed to a method of manufacturing a homogenous, free flowing, liquid solution of oleoresin black pepper. In one embodiment, an amount of oleoresin black pepper is mixed with an amount of cinnamyl alcohol. Any method of mixing known by those skilled in the art is contemplated by the present invention, as by hand mixing or a mechanical stirrer having a propeller blade. The oleoresin black pepper and the cinnamyl alcohol will be mixed in such amounts so that the resulting solution of oleoresin black pepper solution will comprise oleoresin black pepper in an amount from about 10% to about 55% by weight and cinnamyl alcohol in an amount from about 45% to about 90% by weight. Preferably, the solution will comprise from about 30% to about 50% by weight oleoresin black pepper and from about 50% to about 70% cinnamyl alcohol. Most preferably, the solution will comprise from about 35% to about 45% by weight oleoresin black pepper and from about 55% to about 65% cinnamyl alcohol.

In another embodiment of the present invention, an amount of phenyl ethyl alcohol is mixed with an amount of oleoresin black pepper to yield a homogenous, free-flowing liquid solution of oleoresin black pepper. Any method of mixing known by those skilled in the art is contemplated by the present invention. The oleoresin black pepper and the phenyl ethyl alcohol will be mixed in such amounts so that the resulting solution of oleoresin black pepper solution comprise oleoresin black pepper in an amount from about 10% to about 55% by weight oleoresin black pepper and from about 45% to about 90% phenyl ethyl alcohol. Preferably, an amount of oleoresin black pepper and phenyl ethyl alcohol are mixed such that the oleoresin black pepper comprises from about 30% to about 50% by weight of the solution and phenyl ethyl alcohol comprises from about 50% to about 70% by weight of the solution. Most preferably, the solution will comprise from about 45% to about 50% by weight oleoresin black pepper and from about 50% to about 55% by weight phenyl ethyl alcohol.

In yet another embodiment of the present invention, oleoresin black pepper is added to a chewing gum composition pursuant to a homogenous, free-flowing, liquid solution comprising oleoresin black pepper. In one embodiment, a composition comprising from about 10% to about 55% by weight oleoresin black pepper and from about 45% to about 90% by weight cinnamyl alcohol is mixed with the chewing gum. Preferably, a composition comprising from about 30% to about 50% by weight oleoresin black pepper and from about 50% to about 70% by weight cinnamyl alcohol is mixed with the chewing gum. Most preferably, a composition comprising from about 35% to about 45% by weight oleoresin black pepper and from about 55% to about 65% by weight cinnamyl alcohol is mixed with the chewing gum.

In another embodiment of the present invention, a composition comprising from about 10% to about 55% by weight oleoresin black pepper and from about 45% to about 90% by weight phenyl ethyl alcohol is mixed with chewing gum. Preferably, a composition comprising from about 30% to about 50% by weight oleoresin black pepper and from about 50% to about 70% by weight phenyl ethyl alcohol is mixed with chewing gum. Most preferably, a composition comprising from about 45% to about 50% by weight oleoresin black pepper and from about 50% to about 55% by weight ethyl phenyl alcohol is mixed with the chewing gum.

Of the two oleoresin black pepper solutions contemplated for the addition to chewing gum discussed above, the solution comprising oleoresin black pepper and cinnamyl alcohol is preferred for addition to chewing gum. The oleoresin black pepper solution comprising phenyl ethyl alcohol has a tendency to contribute an off-flavor to the chewing gum, and thus, is less desirable for addition to chewing gum than the oleoresin black pepper solution comprising cinnamyl alcohol. Most preferably, the solution comprising oleoresin black pepper and cinnamyl alcohol will be added to a chewing gum comprising cinnamon flavor.

The present invention contemplates that an amount of the liquid composition of oleoresin black pepper will be added to the chewing gum so that the chewing gum comprises from about 0.005% to about 0.5% by weight oleoresin black pepper. Preferably, an amount of oleoresin black pepper solution will be mixed with the chewing gum so that oleoresin black pepper comprises from about 0.02% to about 0.2% by weight of the chewing gum. The liquid composition comprising oleoresin black pepper may be mixed with the chewing gum ingredients at any time during the manufacture of the chewing gum. Preferably, however, the solution comprising oleoresin black pepper is pre-blended with the liquid flavor before addition to the chewing gum. The solution comprising oleoresin black pepper may be pre-blended with the liquid flavor according to any method known by those skilled in the art.

In general, a chewing gum composition comprises a water soluble bulk portion, a water insoluble chewable gum base portion, and typically water insoluble flavors. The water soluble portion dissipates with a portion of the flavor over a period of time during chewing. The gum base portion is retained in the mouth throughout the chew.

The insoluble gum base generally comprises elastomers, resins, fats and oils, waxes, softeners and inorganic fillers. Elastomers may include polyisobutalyne, isobutalyne-isoprene copolymer, styrene butadiene rubber, as well as natural latexes such as chicle. Resins include polyvinyl acetate and terpine resins. Fats and oils may also be included in the gum base including tallow, hydrogenated and partially hydrogenated vegetable oils and cocoa butter. Commonly employed waxes include paraffin, microcrystalline, and natural waxes such as beeswax and carnauba. The insoluble gum base constitutes between about 5% to about 95% by weight of the chewing gum. Preferably, the insoluble gum base comprises about 10% to about 50% by weight of the gum base, and most preferably, about 20% to about 35% by weight of the gum base.

The gum base typically also includes a filler component. The filler component may be calcium carbonate, magnesium carbonate, talc, dicalcium phosphate, and the like. The filler may constitute between about 5% to about 60% by weight of the gum base. Preferably, the filler comprises about 5% to 50% by weight of the chewing gum base.

The gum base typically also contains softeners, including glycerol monostearate and glycerol triacetate. Further, gum bases may also contain optional ingredients such as antioxidants, colors and emulsifiers. The present invention contemplates the use of any and all commercially acceptable gum bases.

The water soluble portion of the chewing gum may further comprise, softeners, sweeteners, flavors and combinations thereof. Softeners are added to the chewing gum in order to optimize the chewability and mouth feel of the gum. Softeners, also known in the art as plasticizers or plasticizing agents, generally constitute between about 0.1% to about 15% by weight of the chewing gum. Softeners contemplated by the present invention include, but are not limited to glycerin, lecithin, and combinations thereof. Further, aqueous sweetener solutions such as those containing sorbitol, hydrogenated starch hydrosylates, corn syrup and combinations thereof, may be used as softeners and binding agents in gum.

Sweeteners contemplated by the present invention for use in chewing gum include both sugar and sugarless components. Sugar sweeteners generally include saccharide-containing components commonly known in the chewing gum art which comprise, but are not limited to sucrose, dextrose, maltose, dextrin, dried invert sugar, fructose, levulose, galactose, corn syrup solids, and the like, alone or in any combination. Sugarless sweeteners include components with sweetening characteristics but are devoid of the commonly known sugars and comprise, but are not limited to sugar alcohols such as sorbitol, mannitol, xylitol, hydrogenated starch hydrosylates, maltitol, and the like, alone or in any combination. Also contemplated for direct addition to the gum are relatively fast releasing high intensity sweeteners such as aspartame, sucralose, acesulfame-K, alitame and saccharin.

Those skilled in the art will recognize that any combination of sugar and/or sugarless sweeteners may be employed in the chewing gum. Further, those skilled in the art will recognize a sweetener may be present in a chewing gum in whole or in part as a water soluble bulking agent. In addition, the softener may be combined with a sweetener such as in an aqueous sweetener solution.

A flavor may be present in a chewing gum in an amount from about 0.1% to about 10% by weight, and preferably from about 0.5% to about 3% by weight of the chewing gum. Flavors contemplated by the present invention include any liquid flavoring which is of food acceptable quality. The flavor may comprise essential oils, synthetic flavors, or mixtures thereof, including but not limited to oils derived from plants and fruits such as citrus oils, fruits essences, peppermint oil, spearmint oil, clove oil, oil of wintergreen, anise and the like. Artificial flavoring components are also contemplated by the present invention. Those skilled in the art will recognize that the natural and artificial flavors may be combined in any manner. All such flavors and blends are contemplated by the present invention.

Oleoresin black pepper is a flavor enhancer and will preferably be pre-blended with the liquid flavor, whereupon the resulting blend is then added to the chewing gum.

Additional ingredients such as colors, emulsifiers, and pharmaceutical agents may be added to the chewing gum.

In general, chewing gum is manufactured by sequentially adding the various chewing gum ingredients to any commercially available mixer known in the art. After the ingredients have been thoroughly mixed, the gum mass is discharged from the mixer and shaped into the desired form, such as by rolling it in sheets and cutting into sticks, extruding into chunks, or casting in pellets.

Generally, the ingredients are mixed by first melting the gum base and adding it to the running mixer. The base may also be melted in the mixer itself. Color may also be added at this time. A softener such as glycerin may then be added next along with syrup and a portion of bulking agent. Further portions of the bulking agents may be added to the mixer. The entire mixing procedure typically takes from about 5 to about 15 minutes, but longer mixing times may sometimes be required. Those skilled in the art will recognize that variations to the above-described procedures may be followed.

It is to be understood that the homogenous, free flowing, liquid solution comprising oleoresin black pepper of the present invention may be added at any time during the gum manufacturing process. Preferably, the solution comprising oleoresin black pepper is pre-blended with the liquid flavor wherein the resulting blend is preferably added to the mixer with the final portion of the bulking agent It is to be understood that an equivalent of changes and modifications of the embodiments described above are also contemplated by the present invention. The following examples are not to be construed as a limitation upon the present invention, but are included merely as an illustration of various embodiments.

EXAMPLES

Example 1

A composition was prepared by mixing homogenous 45 parts by weight of oleoresin black pepper and 55 parts by weight of cinnamyl alcohol using a mechanical stirrer. The resulting homogenous oleoresin black pepper solution was allowed to stand for a period of four months at ambient temperature. The solution remained homogenous without separation or crystallization for this period of time.

Example 2

A composition was prepared by mixing until homogenous 45 parts by weight of oleoresin black pepper and 55 parts by weight of phenyl ethyl alcohol using a mechanical stirrer. The resulting homogenous oleoresin black pepper solution was allowed to stand for four months at ambient temperature. The solution did not separate or crystallize during this period of time.

Example 3

A composition prepared as in Example 1 was blended with a cinnamon flavor blend at a level of 5.5% oleoresin black pepper solution and 94.5% of a cinnamon flavor composed of 65% by weight cinnamic aldehyde, with the remainder of the flavor comprising cinnamon and spice extracts, as well as natural mint oils. The aforedescribed blend was then added to the following sugarless chewing gum composition:

| Ingredients | % |
| --- | --- |
| Base | 25.0 |
| Sorbitol | 52.16 |
| Mannitol | 4.0 |
| Glycerin | 12.7 |
| Talc | 3.0 |
| 10% Aqueous salt solution | 0.4 |
| Color | 0.5 |
| Encapsulated Aspartame | 0.4 |
| Glycyrrhizin | 0.04 |
| Cinnamon Flavor Blend | 1.8 |
| | 100.0% |

The resulting chewing gum was found to be of an acceptable quality, thus demonstrating addition of the solution comprising oleoresin black pepper can effectively be accomplished in the manufacture of a chewing gum.

We claim:

1. A homogenous, liquid oleoresin black pepper solution comprising from about 10% to about 55% by weight oleoresin black pepper and from about 45% to about 90% by weight cinnamyl alcohol.

2. The homogenous, liquid oleoresin black pepper solution of claim 1 comprising from about 30% to about 50% by weight oleoresin black pepper and from about 50% to about 70% by weight cinnamyl alcohol.

3. The homogenous, liquid oleoresin black pepper solution of claim 2 comprising from about 35% to about 45% by weight oleoresin black pepper and from about 55% to about 65% by weight cinnamyl alcohol.

4. A method of solubilizing oleoresin black pepper comprising the following steps:
   providing oleoresin black pepper;
   providing a liquid solution comprising cinnamyl alcohol; and mixing the oleoresin black paper and the liquid solution comprising cinnamyl alcohol so that the oleoresin black pepper comprises from about 10% to about 55% by weight and cinnamyl alcohol comprises from about 45% to about 90% by weight of the resulting oleoresin black pepper solution.

5. The method of claim 4 wherein the oleoresin black pepper solution comprises from about 30% to about 50% by weight oleoresin black pepper and from about 50% to about 70% by weight cinnamyl alcohol.

6. The method of claim 5 wherein the oleoresin black pepper solution comprises from about 35% to about 45% by weight oleoresin black pepper and from about 55% to about 65% by weight cinnamyl alcohol.

7. A method of adding oleoresin black pepper to chewing gum comprising the following steps:
providing a chewing gum;
providing an oleoresin black pepper solution comprising from about 10% to about 55% by weight oleoresin black pepper and from about 45% to about 90% by weight cinnamyl alcohol; and
mixing an amount of the oleoresin black pepper solution with the chewing gum such that oleoresin black pepper comprises from about 0.005% to about 0.5% by weight of the chewing gum.

8. The method of claim 7 wherein the oleoresin black pepper solution comprises from about 30% to about 50% by weight oleoresin black pepper and from about 50% to about 70% by weight cinnamyl alcohol.

9. The method of claim 8 wherein the oleoresin black pepper solution comprises from about 35% to about 45% by weight oleoresin black pepper and from about 55% to about 65% by weight cinnamyl alcohol.

10. The method of claim 9 wherein the oleoresin black pepper solution is pre-blended with liquid flavoring before addition to the chewing gum.

11. The method of claim 10 wherein the liquid flavoring comprises cinnamon.

* * * * *